US012717195B2

(12) United States Patent
Ying et al.

(10) Patent No.: US 12,717,195 B2
(45) Date of Patent: Aug. 25, 2026

(54) LIQUID CRYSTAL DISPLAY PANEL AND DISPLAY DEVICE

(71) Applicant: TCL CHINA STAR OPTOELECTRONICS TECHNOLOGY CO., LTD., Shenzhen (CN)

(72) Inventors: Jianjian Ying, Shenzhen (CN); Jie Li, Shenzhen (CN)

( * ) Notice: Subject to any disclaimer, the term of this patent is extended or adjusted under 35 U.S.C. 154(b) by 322 days.

(21) Appl. No.: 17/772,538

(22) PCT Filed: Apr. 13, 2022

(86) PCT No.: PCT/CN2022/086594
§ 371 (c)(1),
(2) Date: Apr. 28, 2022

(87) PCT Pub. No.: WO2023/184577
PCT Pub. Date: Oct. 5, 2023

(65) Prior Publication Data

US 2024/0201546 A1 Jun. 20, 2024

(30) Foreign Application Priority Data

Mar. 30, 2022 (CN) ......................... 202210327486.4

(51) Int. Cl.
*G02F 1/1362* (2006.01)
*G02F 1/1368* (2006.01)

(52) U.S. Cl.
CPC .. *G02F 1/136222* (2021.01); *G02F 1/136209* (2013.01); *G02F 1/1368* (2013.01)

(58) Field of Classification Search
None
See application file for complete search history.

(56) References Cited

U.S. PATENT DOCUMENTS

2013/0313530 A1* 11/2013 Seo .................. H01L 29/42384 257/40
2015/0318447 A1 11/2015 Choi
2018/0210277 A1* 7/2018 Wang ................ G02F 1/133305
(Continued)

FOREIGN PATENT DOCUMENTS

CN 1512227 A 7/2004
CN 1677207 A 10/2005
(Continued)

OTHER PUBLICATIONS

International Search Report in International application No. PCT/CN2022/086594, mailed on Dec. 15, 2022.
(Continued)

*Primary Examiner* — Richard H Kim

(57) ABSTRACT

The present application discloses a liquid crystal display panel and a display device. In the liquid crystal display panel, a sub-pixel area includes a light-emitting area and a circuit area connected to the light-emitting area. Each of sub-pixel driving circuits is correspondingly disposed in a circuit area, and each of the sub-pixel driving circuits includes at least one thin film transistor. At least three sub-color resists of a same color resist are respectively arranged in at least three sub-pixel areas of a same pixel area. Colors of secondary color resists of the at least three sub-color resists arranged in the same pixel area are same.

14 Claims, 3 Drawing Sheets

(56) References Cited

U.S. PATENT DOCUMENTS

| | | | | |
|---|---|---|---|---|
| 2021/0026209 | A1* | 1/2021 | Shin | G02F 1/136286 |
| 2021/0151525 | A1* | 5/2021 | Li | G06V 40/10 |

FOREIGN PATENT DOCUMENTS

| | | | |
|---|---|---|---|
| CN | 103427023 | A | 12/2013 |
| CN | 104730759 | A | 6/2015 |
| CN | 107329340 | A | 11/2017 |
| CN | 108364985 | A | 8/2018 |
| CN | 209570781 | U | 11/2019 |
| CN | 111045267 | A | 4/2020 |
| CN | 111584573 | A | 8/2020 |
| JP | 2003114449 | A | 4/2003 |
| JP | 2008233728 | A | 10/2008 |

OTHER PUBLICATIONS

Written Opinion of the International Search Authority in International application No. PCT/CN2022/086594, mailed on Dec. 15, 2022.

Chinese Office Action issued in corresponding Chinese Patent Application No. 202210327486.4 dated Apr. 7, 2023, pp. 1-8.

* cited by examiner

LIQUID CRYSTAL DISPLAY PANEL AND DISPLAY DEVICE

BACKGROUND OF INVENTION

Field of Invention

The present application relates to the field of display technology, and in particular, to a liquid crystal display panel and a display device.

Description of Prior Art

A liquid crystal display (LCD) has been widely used due to its various advantages such as thin body, power saving, and no radiation. The liquid crystal display panel controls deflection angles of liquid crystals by adopting a voltage to control a screen to display different pictures. Since the liquid crystal display panel itself does not have characteristics of self-illumination, a backlight module is required to be arranged below the liquid crystal display panel to provide a backlight source required by the liquid crystal display panel, and then spatial color mixing is performed by setting color resists of different colors.

Color shift is a stubborn problem in panel display. One of important reasons for causing color shift is that materials of the color resists of difference colors lead to different offsets in an I-V curve of the thin film transistors arranged in different sub-pixel areas under high temperature and humidity conditions, thereby resulting in a problem of reddish/greenish color shift on the display.

SUMMARY OF INVENTION

Embodiments of the present application provide a liquid crystal display panel and a display device to solve the problem of color shift in the existing liquid crystal display panel caused by color resists of different colors leading to different characteristic shifts of the thin film transistors in the corresponding sub-pixel areas The present application provides a liquid crystal display panel, which includes:

a plurality of pixel areas, wherein each of the pixel areas includes at least three sub-pixel areas, and each of the sub-pixel areas includes a light-emitting area and a circuit area connected to the light-emitting area;

a plurality of sub-pixel driving circuits, wherein each of the plurality of sub-pixel driving circuits is correspondingly disposed in the circuit area, and each of the sub-pixel driving circuits includes at least one thin film transistor; and a plurality of color resists, wherein each of the color resists includes at least three sub-color resists, and the at least three sub-color resists of a same one of the color resists are respectively arranged in the at least three of the sub-pixel areas of a same one of the pixel areas; each of the sub-color resists includes a main color resist at least covering the light-emitting area and a secondary color resist at least covering at least the thin film transistor; and the secondary color resists of the at least three sub-color resists arranged in the same one of the pixel areas have a same color.

In the embodiment of the present application, the sub-color resist has the same influence on the thin film transistors arranged in different sub-pixel areas of the same pixel area, and the difference in characteristic offsets of thin film transistors arranged in different sub-pixel areas can be reduced, thereby reducing the generation of color shift, thus improving display quality.

Optionally, in some embodiments of the present application, in the same one of the pixel areas, the circuit area of each of the sub-pixel areas is covered by a corresponding one of the secondary color resists.

In the embodiment of the present application, on the one hand, different color resists can be prevented from impacting different circuits of the sub-pixel driving circuit; on the other hand, shapes of the color resists are relatively regular, which simplifies the process.

Optionally, in some embodiments of the present application, each of the pixel areas includes a blue sub-pixel area, a red sub-pixel area, and a green sub-pixel area, the main color resist of the light-emitting area covering the blue sub-pixel area is a blue main color resist, the main color resist of the light-emitting area covering the red sub-pixel area is a red main color resist, and the main color resist of the light-emitting area covering the green sub-pixel area is a green main color resist.

In the embodiment of the present application, the structure of the RGB pixel arrangement is simple and the process is mature, and when applied in the present application, the process can be simplified and the production cost can be reduced.

Optionally, in some embodiments of the present application, the secondary color resists disposed in the at least three sub-pixel areas of the same one of the pixel areas are all blue secondary color resists, red secondary color resists, or green secondary color resists.

In the embodiment of the present application, since the current offset of the thin film transistor under the influence of the green secondary color resist is the smallest, in the circuit areas of the plurality of sub-pixel areas, all the sub-color resists which are set to cover thin film transistors are the green secondary color resist, so that each of the thin film transistors has better stability.

Optionally, in some embodiments of the present application, in the circuit area of the at least three sub-pixel areas in the same one of the pixel areas, each of the secondary color resists is formed by stacking at least two of a blue secondary color resist, a red secondary color resists, and a green secondary color resist; and portions of the secondary color resists of the at least three sub-color resists arranged in the same one of the pixel areas close to a corresponding one of the thin film transistors have a same color.

In the embodiment of the present application, a plurality of layers of sub-color resists with different colors are stacked to form a light-shielding area. There is no need to form a black matrix on the color filter substrate, which saves the mask manufacturing process and simplifies the process. At the same time, the difference in the characteristic offsets of the thin film transistors arranged in different sub-pixel areas can be reduced, thereby reducing the generation of color shift.

Optionally, in some embodiments of the present application, in the circuit area of the red sub-pixel area, the green secondary color resist and the blue secondary color resist are stacked; in the circuit area of the blue sub-pixel area, the green secondary color resist and the red secondary color resist are stacked; and in the circuit area of the green sub-pixel area, the green secondary color resist and the blue secondary color resist are stacked, or the green secondary color resist and the blue secondary color resist are stacked, or the green secondary color resists and the red secondary color resist are stacked.

Optionally, in some embodiments of the present application, the secondary color resists and the main color resists disposed in the at least three sub-pixel areas of the same one of the pixel areas are different from each other.

In this embodiment of the present application, a color resist material that has the least influence on the characteristics of the thin film transistor may be selected to form a sub-color resist, so as to prevent a large difference in topography between the light-emitting area and the circuit area. At the same time, the influence of sub-color resist on each of the thin film transistors is minimized.

Optionally, in some embodiments of the present application, the liquid crystal display panel further includes an array substrate, a color filter substrate, and a liquid crystal layer between the array substrate and the color filter substrate;

wherein the array substrate includes a first substrate, a plurality of the thin film transistors are arranged on the first substrate at intervals, and the color resists is arranged on a side of the thin film transistor away from the first substrate.

The embodiment of the present application adopts the COA technology. A COA structure can significantly reduce the parasitic capacitance, increase the aperture ratio of the liquid crystal display panel, and improve the display quality.

Optionally, in some embodiments of the present application, the color filter substrate includes a second substrate and a black matrix; and the black matrix is arranged on a side of the second substrate close to the array substrate, and an orthographic projection of the black matrix on the first substrate at least covers an orthographic projection of each of the secondary color resists located above the thin film transistors on the first substrate.

In the embodiment of the present application, by arranging a black matrix in the color filter substrate, the sub-color resist located in the circuit area can be shielded, and color mixing can be prevented.

Optionally, in some embodiments of the present application, the liquid crystal display panel further includes a planarization layer and a pixel electrode, the planarization layer is disposed on a side of the color resists away from the first substrate, the planarization layer is provided with a via hole, and the pixel electrode is electrically connected to a corresponding one of the thin film transistors through the via hole.

In the embodiment of the present application, by forming a planarization layer on the color resists, the discontinuity between adjacent main color resists due to overlapping is eliminated, and the liquid crystal above the overlapping area is prevented from being inverted due to topographic differences.

Correspondingly, the present application also provides a display device, which includes a liquid crystal display panel and a backlight module arranged opposite to each other, the backlight module is configured to provide a light source to the liquid crystal display panel, and the display panel includes:

a plurality of pixel areas, wherein each of the pixel areas includes at least three sub-pixel areas, and each of the sub-pixel areas includes a light-emitting area and a circuit area connected to the light-emitting area;

a plurality of sub-pixel driving circuits, wherein each of the plurality of sub-pixel driving circuits is correspondingly disposed in the circuit area, and each of the sub-pixel driving circuits includes at least one thin film transistor; and a plurality of color resists, wherein each of the color resists includes at least three sub-color resists, and the at least three sub-color resists of a same one of the color resists are respectively arranged in the at least three of the sub-pixel areas of a same one of the pixel areas; each of the sub-color resists includes a main color resist at least covering the light-emitting area and a secondary color resist at least covering at least the thin film transistor; and the secondary color resists of the at least three sub-color resists arranged in the same one of the pixel areas have a same color.

Optionally, in some embodiments of the present application, in the same one of the pixel areas, the circuit area of each of the sub-pixel areas is covered by a corresponding one of the secondary color resists.

Optionally, in some embodiments of the present application, each of the pixel areas includes a blue sub-pixel area, a red sub-pixel area, and a green sub-pixel area, the main color resist of the light-emitting area covering the blue sub-pixel area is a blue main color resist, the main color resist of the light-emitting area covering the red sub-pixel area is a red main color resist, and the main color resist of the light-emitting area covering the green sub-pixel area is a green main color resist.

Optionally, in some embodiments of the present application, the secondary color resists disposed in the at least three sub-pixel areas of the same one of the pixel areas are all blue secondary color resists, red secondary color resists, or green secondary color resists.

Optionally, in some embodiments of the present application, in the circuit area of the at least three sub-pixel areas in the same one of the pixel areas, each of the secondary color resists is formed by stacking at least two of a blue secondary color resist, a red secondary color resists, and a green secondary color resist; and portions of the secondary color resists of the at least three sub-color resists arranged in the same one of the pixel areas close to a corresponding one of the thin film transistors have a same color.

Optionally, in some embodiments of the present application, in the circuit area of the red sub-pixel area, the green secondary color resist and the blue secondary color resist are stacked; in the circuit area of the blue sub-pixel area, the green secondary color resist and the red secondary color resist are stacked; and in the circuit area of the green sub-pixel area, the green secondary color resist and the blue secondary color resist are stacked, or the green secondary color resists and the red secondary color resist are stacked.

Optionally, in some embodiments of the present application, the secondary color resists and the main color resists disposed in the at least three sub-pixel areas of the same one of the pixel areas are different from each other.

Optionally, in some embodiments of the present application, the liquid crystal display panel further includes an array substrate, a color filter substrate, and a liquid crystal layer between the array substrate and the color filter substrate;

wherein the array substrate includes a first substrate, a plurality of the thin film transistors are arranged on the first substrate at intervals, and the color resists is arranged on a side of the thin film transistor away from the first substrate.

Optionally, in some embodiments of the present application, the color filter substrate includes a second substrate and a black matrix; and the black matrix is arranged on a side of the second substrate close to the array substrate, and an orthographic projection of the black matrix on the first substrate at least covers an orthographic projection of each of the secondary color resists located above the thin film transistors on the first substrate.

Optionally, in some embodiments of the present application, the liquid crystal display panel further includes a planarization layer and a pixel electrode, the planarization layer is disposed on a side of the color resisters away from the first substrate, the planarization layer is provided with a via hole, and the pixel electrode is electrically connected to a corresponding one of the thin film transistor through the via hole.

The present application provides a liquid crystal display panel and a display device. The liquid crystal display panel includes a plurality of pixel areas, a plurality of sub-pixel driving circuits and a plurality of color resists. Each of the pixel areas includes at least three sub-pixel areas, and each of the sub-pixel areas includes a light-emitting area and a circuit area connected to the light-emitting area. Each of the sub-pixel driving circuits is correspondingly disposed in a circuit area, and each of the sub-pixel driving circuits includes at least one thin film transistor. Each of the color resists includes at least three sub-color resists, and at least three sub-color resists of the same color resist are respectively arranged in at least three sub-pixel areas of the same pixel area. Each of the sub-color resists includes a main color resist at least covering the light-emitting area and a sub-color resist at least covering the thin film transistor. In the circuit areas of at least three sub-pixel areas in the same pixel area, the present application can reduce the difference in the characteristic offsets of the thin-film transistors arranged in different sub-pixel areas by setting the sub-color resists at least covering the thin-film transistors to the same color, thereby reducing the generation of color shift and improving display quality. Moreover, since the thin film transistors are arranged in the circuit area, even if the sub-color resists of the same color are arranged in different circuit areas, normal light emission of the light-emitting area will not be impacted.

BRIEF DESCRIPTION OF DRAWINGS

In order to more clearly illustrate the technical solutions of the embodiments of the present application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the present application and are not used to limit the present application.

Embodiments of the present application provide a liquid crystal display panel and a display device, which will be described in detail below. It should be noted that the order of description in the following embodiments is not intended to limit the preferred order of the embodiments.

Figure 1:
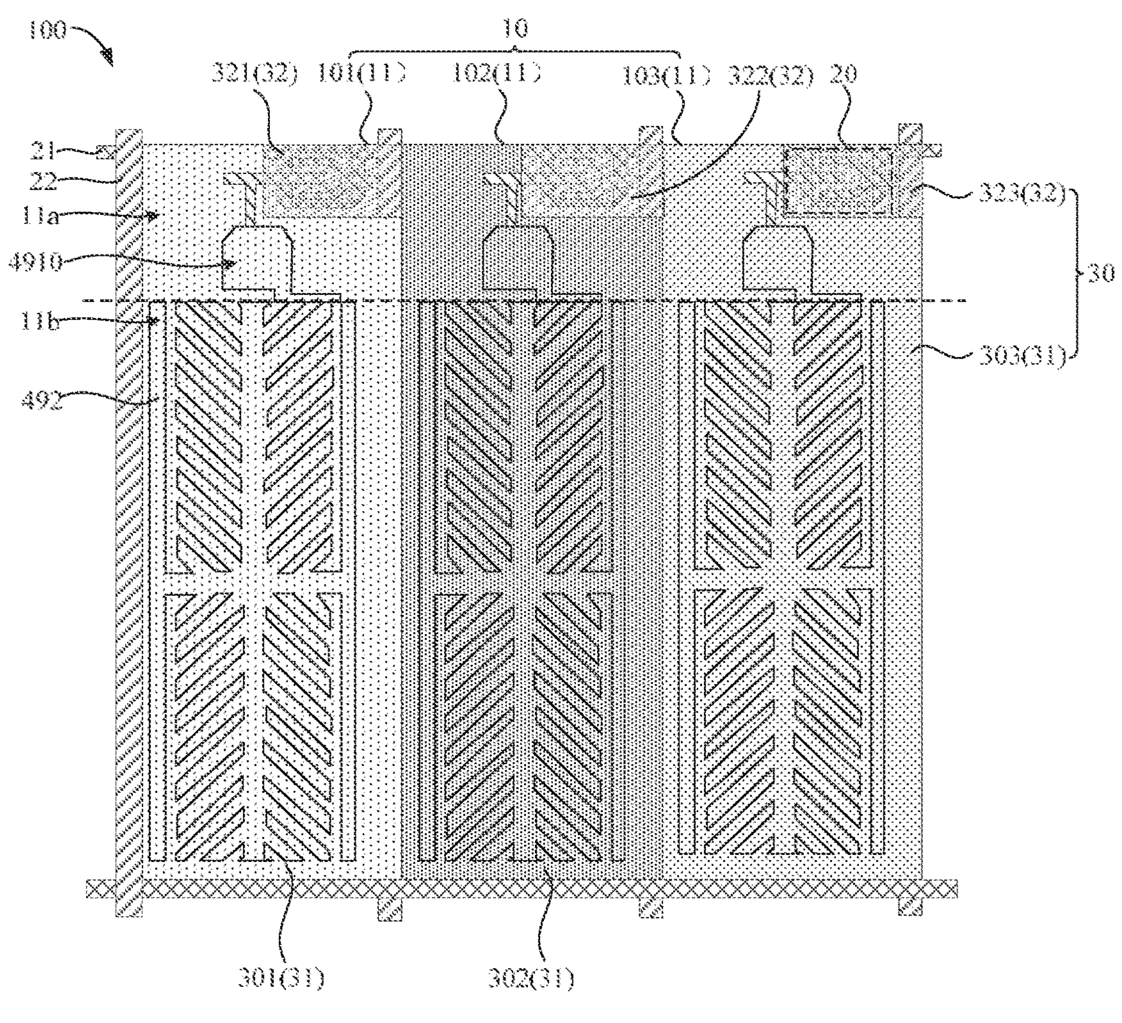
FIG. 1 is a first schematic plan view of a liquid crystal display panel provided by the present application.
Figure 2:
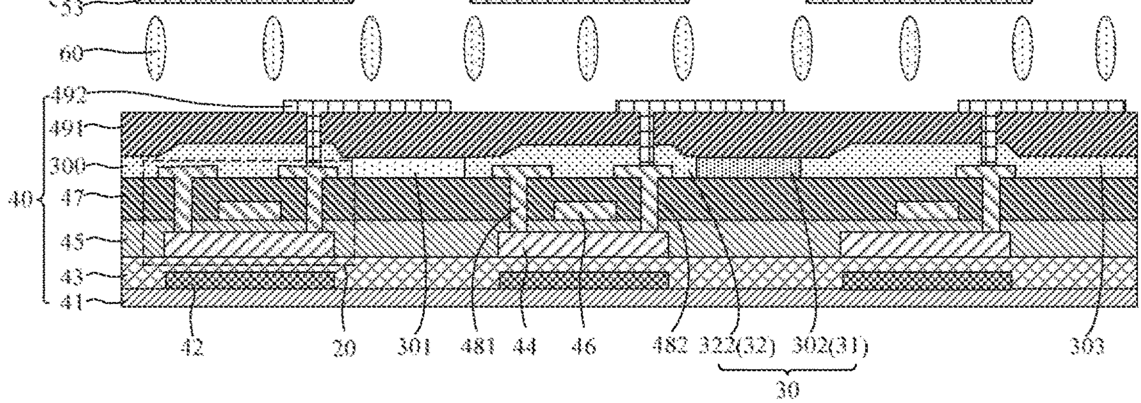
FIG. 2 is a schematic diagram of a first structure of a liquid crystal display panel provided by the present application.

Referring to FIG. 1 and FIG. 2, FIG. 1 is a first schematic plan view of the liquid crystal display panel provided by the present application. FIG. 2 is a schematic diagram of a first structure of a liquid crystal display panel provided by the present application. In the embodiment of the present application, the liquid crystal display panel 100 includes a plurality of pixel areas 10, a plurality of sub-pixel driving circuits, and a plurality of color resists 300.

Each of the pixel areas 10 includes at least three sub-pixel areas 11, and each of the sub-pixel areas 11 includes a light-emitting area 11*b* and a circuit area 11*a* connected to the light-emitting area 11*b*. The sub-pixel driving circuits are provided in the circuit area 11*a*. Each of the sub-pixel driving circuits is correspondingly disposed in a circuit area 11*a*. Each of the sub-pixel driving circuits includes at least one thin film transistor 20. Each of the color resists 300 includes at least three sub-color resists 30. At least three sub-color resists 30 of a same color resist 300 are respectively disposed in at least three sub-pixel areas 11 of the same pixel area 10. Each of the sub color resists 30 includes a main color resist 31 covering at least the light-emitting area 11*b* and a secondary color resist 32 covering at least the thin film transistor 20. Colors of the secondary color resists 32 of the at least three sub-color resists 30 disposed in the same pixel area 10 are the same.

The liquid crystal display panel 100 may further include a plurality of scan lines 21 and a plurality of data lines 22. The plurality of data lines 22 and the plurality of scan lines 21 cross each other to define the plurality of sub-pixel areas 11. Each of the thin film transistors 20 is electrically connected to a corresponding one of the scan line 21 and the data line 22 respectively, so as to drive the sub-pixel areas 11 to emit light.

The sub-pixel driving circuit includes at least one thin film transistor 20. For example, in some embodiments of the present application, the sub-pixel driving circuit may include 1T1C (one thin film transistor 20 and one storage capacitor), 2T1C (two thin film transistors 20 and one storage capacitor), etc., which are not particularly limited in the present application. Of course, in sub-pixel driving circuits of different structures, as long as the same secondary color resist 32 is configured to cover the thin film transistors 20 corresponding to different sub-pixel areas 11, it is within the protection scope of the present application, and will not be repeated herein for brevity.

Each of the pixel areas 10 includes at least three sub-pixel areas 11, which can realize image display of different colors by utilizing a principle of spatial color mixing. The color of each of the sub-pixel areas 11 will be described in the following embodiments, and will not be repeated herein for brevity.

The color resists include at least three main color resists 31, which facilitates the sub-pixel areas 11 corresponding to different colors to transmit light of the corresponding colors. The color of the sub-pixel area 11 may be the same as the color of the secondary color resist 32 in the sub-color resist 30. The color of the sub-pixel area 11 may also be different from the color of the secondary color resist 32 in the sub-color resist 30, which will be described in the following embodiments, and will not be repeated herein for brevity. In addition, the main color resists 31 of different colors or the secondary color resists 32 of different colors are formed of corresponding color resist materials, which adopts a technique well known to those skilled in the art.

In the embodiment of the present application, in the circuit areas 11*a* of the plurality of sub-pixel areas 11 of the same pixel area 10, the secondary color resists 32 at least covering the thin film transistors 20 are set to the same color, so as to ensure the color resist materials covering the thin film transistors 20 to be the same. As such, influences of the secondary color resists 32 on the thin film transistors 20 driving different sub-pixel areas 11 are the same, and the difference in the characteristic offsets of the thin film transistors 20 corresponding to the different secondary color resists 32 can be reduced, thereby reducing the generation of color shift and improving the display quality. Moreover, since the thin film transistors 20 are arranged in the circuit area 11*a*, even if the secondary color resists 32 of the same color are arranged in different circuit areas 11*a*, the normal light emission of the light-emitting area 11*b* will not be impacted.

In the embodiment of the present application, the thin film transistor 20 may be a low temperature polysilicon thin film transistor, an oxide semiconductor thin film transistor, or an amorphous silicon thin film transistor. In addition, the thin film transistors 20 in all the sub-pixel driving circuits provided by the present application are all of the same type of transistors, so as to prevent the influence of differences between different types of transistors on the sub-pixel driving circuits.

In the embodiment of the present application, the liquid crystal display panel 100 further includes an array substrate 40, a color filter substrate 50, and a liquid crystal layer 60 located between the array substrate 40 and the color filter substrate 50.

The array substrate 40 includes a first substrate 41. The plurality of thin film transistors 20 are arranged on the first substrate 41 at intervals. The color resist 300 is disposed on the side of the thin film transistor 20 away from the first substrate 41.

Specifically, the array substrate 40 includes but is not particularly limited to a first substrate 41; a light-shielding layer 42 disposed on the first substrate 41; a buffer layer 43 disposed on the substrate 41 and covering the light-shielding layer 42; and an active layer 44, a gate insulating layer 45, a gate 46, and an interlayer dielectric layer 47 arranged above the buffer layer 43 and covering the active layer 44, the gate insulating layer 45, and the gate 46. The active layer 44 includes a channel area, and a source electrode area and a drain electrode area on opposite sides of the channel area. The source electrode 481 disposed on the interlayer dielectric layer 47 is electrically connected to the source electrode area. The drain electrode 482 disposed on the interlayer dielectric layer 47 is electrically connected to the drain electrode area. The source electrode 481 and the drain electrode 482 are also covered with a color resist 300.

It should be noted that the present application does not limit the structure of the thin film transistor 20 formed in the array substrate 40, and the accompanying drawings are only provided for exemplary illustration. The thin film transistor 20 may be a top gate thin film transistor, a bottom gate thin film transistor, a double gate thin film transistor, or a single gate thin film transistor. The specific structure of the thin film transistor 20 will not be repeated in the present application for brevity.

The embodiment of the present application adopts a technology of preparing the color resist 300 on the array substrate 40, that is, color-filter-on-array (COA) technology. Since a COA structure reduces coupling between the pixel electrode and the metal wiring, delay of signals on the metal wiring is improved. The COA structure can significantly reduce a parasitic capacitance, increase an aperture ratio of the liquid crystal display panel 100, and improve the display quality.

In addition, the color resists 300 are provided in both the circuit area 11*a* and the light-emitting area 11*b* in embodiments of the present application, which can prevent the poor display of the periphery caused by a height difference between the circuit area 11*a* and the light-emitting area 11*b*.

Further, in the embodiment of the present application, the color filter substrate 50 includes a second substrate 51 and a black matrix 52. The black matrix 52 is disposed on the side of the second substrate 51 close to the array substrate 40. The orthographic projection of the black matrix 52 on the first substrate 41 at least covers the orthographic projection of the color resist 31 located above the thin film transistor 20 on the first substrate 41. Further, the orthographic projection of the black matrix 52 on the first substrate 41 can completely cover the circuit area 11*a*.

It is appreciated that the color resists 300 respectively form main color resists 31 of different colors corresponding to the sub-pixel areas 11 of different colors. During the manufacturing process, a certain degree of conjunction area will be generated between adjacent main color resists 31, which may easily lead to color mixing between adjacent sub-pixel areas 11. Therefore, in the embodiment of the present application, by arranging the black matrix 52 to shield the secondary color resists 32 located in the circuit area 11*a*, color mixing between adjacent sub-pixel areas 11 can be prevented.

In addition, the color filter substrate 50 may further include a common electrode 53. The common electrode 53 is blanketly disposed on the side of the second substrate 51 close to the array substrate 40 and covers the second substrate 51 and the black matrix 52. Of course, in other embodiments, the common electrode 53 can also be patterned, which can be specifically designed according to actual requirements.

In some embodiments of the present application, the liquid crystal display panel 100 further includes a planarization layer 491 and a pixel electrode 492. The planarization layer 491 is disposed on the side of the color resist 300 away from the first substrate 41. The planarization layer 491 is provided with via holes 4910. The pixel electrodes 492 are electrically connected to the corresponding thin film transistors 20 through the via holes 4910. Specifically, the via hole 4910 penetrates through the planarization layer 491 and extends to the color resist 300 to expose a side surface of the drain electrode 482 away from the first substrate 41. The pixel electrodes 492 are electrically connected to the corresponding drain electrodes 482 through the via holes 4910. The source electrode 481 and the drain electrode 482 are symmetrically arranged and can be interchanged.

In the embodiment of the present application, by forming a planarization layer 491 on the color resists 300, the discontinuity between adjacent sub-color resists 30 due to overlapping is eliminated, and the liquid crystal 60 located above the overlapping area is also prevented from being inverted due to topographic differences.

In the embodiment of the present application, each of the pixel areas 10 includes a blue sub-pixel area 101, a red sub-pixel area 102, and a green sub-pixel area 103. The main color resist 31 covering the light-emitting area 11*b* of the blue sub-pixel area 101 is the blue main color resist 301. The main color resist 31 covering the light-emitting area 11*b* of the red sub-pixel area 102 is the red main color resist 302. The main color resist 31 covering the light-emitting area 11*b* of the green sub-pixel area 103 is the green main color resist 303.

The liquid crystal display panel 100 provided by the embodiments of the present application may adopt a standard RGB pixel arrangement structure, an RGB PenTile pixel arrangement structure, an RGB Delta pixel arrangement structure, an RGBW pixel arrangement structure, etc., which may be specifically set according to the display requirements of the liquid crystal display panel 100.

In another embodiment of the present application, each of the pixel areas 10 includes a blue sub-pixel area 101, a red sub-pixel area 102, a green sub-pixel area 103, and a white sub-pixel area (not shown). The main color resist 31 covering the light-emitting area 11*b* of the blue sub-pixel area 101 is the blue main color resist 301. The main color resist 31 covering the light-emitting area 11*b* of the red sub-pixel area 102 is the red main color resist 302. The main color resist 31 covering the light-emitting area 11*b* of the green sub-pixel area 103 is the green main color resist 302. The transparent color resist is disposed corresponding to the light-emitting area 11*b* of the white sub-pixel area.

A material of the transparent color resist can be selected from polyimide resin, polyvinyl alcohol resin, epoxy resin, acrylic resin, and other transparent insulating materials known to those skilled in the art.

The RGB pixels are arranged to form a simple structure by mature technology, and when such technology applied in the present application, the process can be simplified and the production cost can be reduced. The RGBW pixel arrangement structure adds a white sub-pixel area, so that the light transmittance of the liquid crystal display panel 100 is significantly improved. The brightness of the liquid crystal display panel 100 is also improved on the basis of the traditional RGB pixel arrangement structure.

In some embodiments of the present application, the secondary color resists 32 disposed in the at least three sub-pixel areas 11 of the same pixel area 10 are all the blue secondary color resists 321, the red secondary color resists 322, or the green secondary color resists 323.

Figure 3:
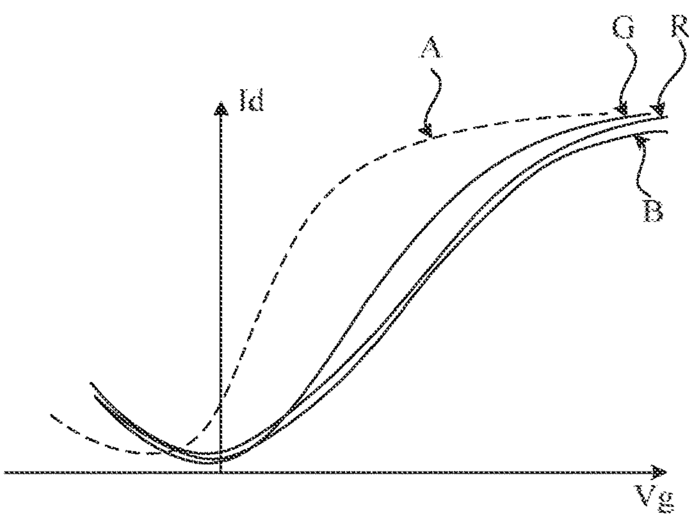
FIG. 3 is a schematic diagram of an I-V curve of the thin film transistor provided by the present application under an influence of different color resists.

Specifically, refer to FIG. 3, which is a schematic diagram of an I-V curve of the thin film transistor provided by the present application under an influence of color resists of different colors, wherein the abscissa represents a voltage connected to the gate 46 of the thin film transistor 20, and the ordinate represents a current flowing through the thin film transistor 20. Curve A represents an I/V curve of the thin film transistor 20 under normal temperature and normal humidity. Curve G represents an I/V curve of the thin film transistor 20 under the influence of the green secondary color resist 323 under high temperature and high humidity. Curve B represents an I/V curve of the thin film transistor 20 under the influence of the blue secondary color resist 321 under high temperature and high humidity. Curve R represents the I/V curve of the thin film transistor 20 in the red secondary color resist 322 under high temperature and high humidity. High temperature generally refers to a temperature of about 60 degrees Celsius, and high humidity generally refers to an air humidity of about 90%.

As shown in FIG. 3, under the environment of high temperature and high humidity, the current offsets of the thin film transistor 20 under the influences of the blue secondary color resist 321 and the red secondary color resist 322 are equal. The current offset of the thin film transistor 20 under the influence of the green secondary color resist 323 is the smallest. Therefore, in the embodiment of the present application, in at least three sub-pixel areas 11 of the same pixel area 10, the color resists covering the thin film transistors 20 are all green main color resists 303, which can make each of the thin film transistors 20 have a better stability.

Figure 4:
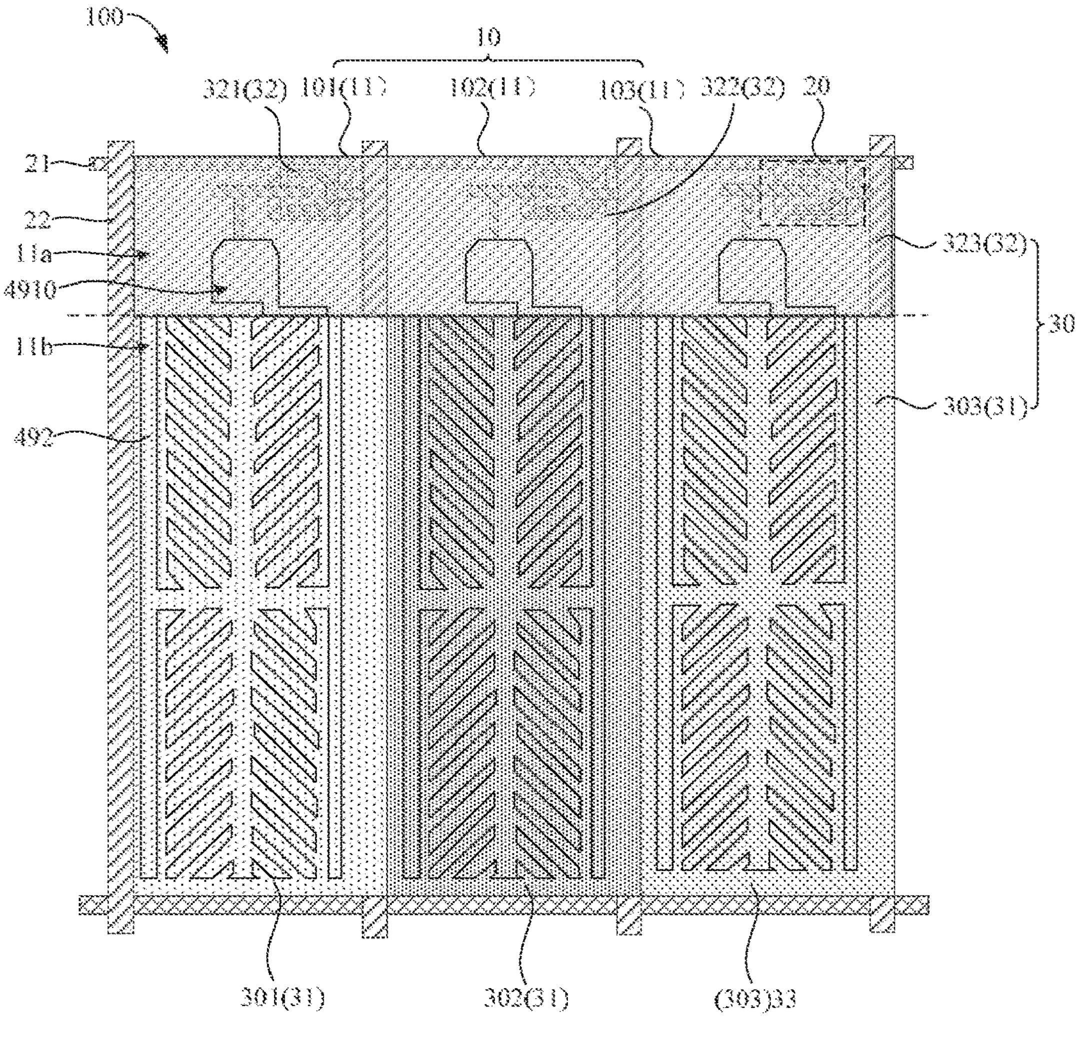
FIG. 4 is a second schematic plan view of the liquid crystal display panel provided by the present application.

Referring to FIG. 4, FIG. 4 is a second schematic plan view of the liquid crystal display panel provided by the present application. The difference from the liquid crystal display panel 100 shown in FIG. 1 is that in the embodiment of the present application, in the same pixel area 10, the circuit area 11*a* of each of the sub-pixel areas 11 is covered by a corresponding secondary color resist 32.

It is appreciated that since the circuit area 11*a* does not affect light emission, in the circuit areas 11*a* of the plurality of sub-pixel areas 11, the same secondary color resists 32 of the same color are configured to cover the entire circuit areas 11*a*, so that the secondary color resists 32 of the same color fully cover the entire circuit areas 11*a*. On the one hand, the influence of different secondary color resists 32 on different circuits of the sub-pixel driving circuit is prevented. On the other hand, the shape of the secondary color resist 32 is relatively regular, which simplifies the process.

Figure 5:
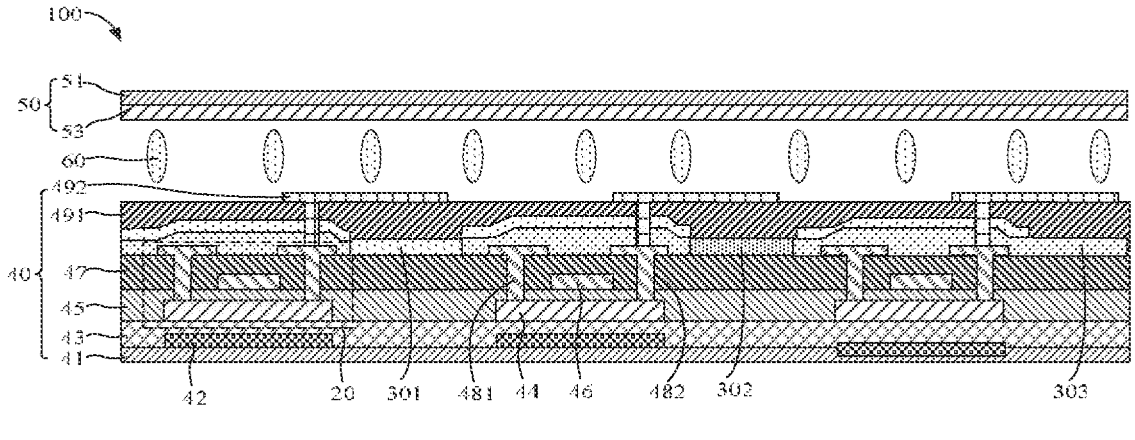
FIG. 5 is a schematic diagram of a second structure of the liquid crystal display panel provided by the present application.

Referring to FIG. 5, FIG. 5 is a schematic diagram of a second structure of the liquid crystal display panel provided by the present application. The difference from the liquid crystal display panel 100 shown in FIG. 2 is that in the embodiment of the present application, in the circuit area 11*a* of the at least three sub-pixel areas 11 of the same pixel area 10, each of the sub-color resists 32 is formed by stacking at least two of a blue secondary color resist 321, a red secondary color resist 322, and a green secondary color resist 323; and portions of the secondary color resists 32 of the at least three sub-color resists 30 arranged in the same one of the pixel areas 10 close to a corresponding one of the thin film transistors 20 have a same color.

For example, in the circuit area 11*a* of the red sub-pixel area 102, a green main color resist 303 and a blue main color resist 301 are stacked. In the circuit area 11*a* of the blue sub-pixel area 101, a green secondary color resist 323 and a red secondary color resist 322 are stacked. In the circuit area 11*a* of the green sub-pixel area 103, the green secondary color resist 323 and the blue secondary color resist 321 are stacked, or the green secondary color resist 323 and the red secondary color resist 322 are stacked. For another example, in the circuit area 11*a* of the red sub-pixel area 102, a green secondary color resist 323, a blue secondary color resist 321, and a red secondary color resist 322 are stacked. In the circuit area 11*a* of the blue sub-pixel area 101, a green secondary color resist 323, a red secondary color resist 322, and a blue secondary color resist 321 are stacked. In the circuit area 11*a* of the green sub-pixel area 103, a green secondary color resist 323, a blue secondary color resist 321, and a red secondary color resist 322 are stacked. Details will not be described herein for brevity.

It is appreciated that, in the circuit areas 11*a* of the plurality of sub-pixel areas 11, at least two of the blue secondary color resist 321, the red secondary color resist 322, and the green secondary color resist 323 are stacked, so that the stacked multi-layers of the secondary color resists 32 of different colors form light-shielding areas. On the other hand, it is unnecessary to form a black matrix on the color filter substrate 50, thereby saving a mask manufacturing process, simplifying the process, and saving material cost and manufacturing time. In addition, since the same type of the blue secondary color resists 321, the red secondary color resists 322, or the green secondary color resists 323 are all arranged on the side close to the thin film transistors 20, different characteristic offsets of thin film transistors arranged in different sub-pixel areas can be reduced, thereby reducing the generation of color shift, thus improving display quality.

In some embodiments of the present application, the secondary color resist 32 covering the thin film transistor 20 is different from the main color resist 31 located in the light-emitting area 11*b*.

It is appreciated that different sub-pixel areas 11 need to emit light of different colors to display different pictures on the liquid crystal display panel 100. The light of corresponding colors emitted by different sub-pixel areas 11 need to be filtered by the main color resists 31 of the corresponding colors. Therefore, each of the sub-pixel areas 11 corresponds to a main color resist 31 of a corresponding color. The circuit area 11*a* does not need to emit light, nor does it affect emission of the sub-pixel areas 11, so that the secondary color resist 32 covering the thin film transistor 20 may be different from the main color resist 31 located in the light-emitting area 11*b*. Therefore, the color resist material that has the least influence on the characteristics of the thin film transistors 20 can be selected to form the secondary color resist 32, so as to prevent a vast difference in topography between the light-emitting area 11*b* and the circuit area 11*a*. Meanwhile, the influence of the secondary color resist 32 on each of the thin film transistors 20 is minimized.

Correspondingly, the present application also provides a display device, which includes a liquid crystal display panel and a backlight module arranged opposite to each other, and the backlight module is configured for providing a light source to the liquid crystal display panel.

In addition, the display device may be a smart phone, a tablet computer, an e-book reader, a smart watch, a video camera, a game console, etc., which is not particularly limited in the present application.

Figure 6:
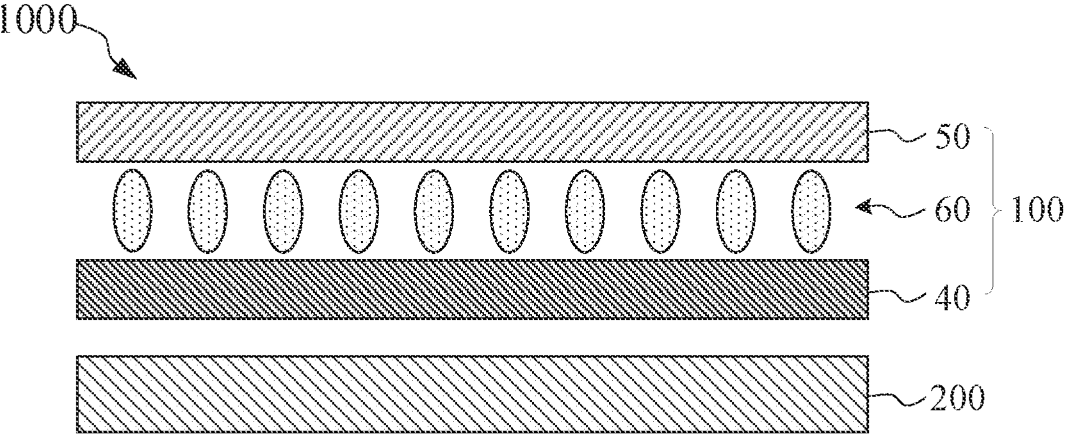
FIG. 6 is a schematic structural diagram of a liquid crystal display device provided by the present application.

Specifically, referring to FIG. 6, FIG. 6 is a schematic structural diagram of a display device provided by the present application. The display device 1000 includes a liquid crystal display panel 100 and a backlight module 200 disposed opposite to each other. The backlight module 200 is configured for providing a light source to the liquid crystal display panel 100. The backlight module 200 may use a direct-lit backlight or an edge-lit backlight, which is not specifically limited in the present application.

In the liquid crystal display device 1000 provided by the embodiment of the present application, the liquid crystal display panel 100 includes a plurality of pixel areas, a sub-pixel driving circuit, and a plurality of color resists. Each of the pixel areas includes at least three sub-pixel areas, and each of the sub-pixel areas includes a light-emitting area and a circuit area connected to the light-emitting area. Each of the sub-pixel driving circuits is correspondingly disposed in a circuit area, and each of the sub-pixel driving circuits includes at least one thin film transistor. Each of the color resists includes at least three sub-color resists, and at least three sub-color resists of the same color resist are respectively arranged in at least three sub-pixel areas of the same pixel area. Each of the sub-color resists includes a main color resist at least covering the light-emitting area and a sub-color resist at least covering the thin film transistor. In the circuit areas of at least three sub-pixel areas in the same pixel area, the present application can reduce the difference in characteristic offsets of thin film transistors arranged in different sub-pixel areas by setting the sub-color resists at least covering the thin-film transistors to the same color, thereby reducing the generation of color shift and improving display quality of the liquid crystal display device 1000.

The liquid crystal display panel and the display device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A liquid crystal display panel, comprising:

a plurality of pixel areas, each comprising at least three sub-pixel areas, and each sub-pixel areas comprising a light-emitting area and a circuit area connected to the light-emitting area;

a plurality of sub-pixel driving comprising a plurality of thin film transistors, wherein each sub-pixel driving circuit is disposed in the circuit area of a sub-pixel area of a pixel area;

a plurality of color resistors, each comprising at least three sub-color resistors respectively arranged in the sub-pixel areas of a pixel area, the sub-color resistors each comprising a main color resistor and a secondary color resistor, wherein the main color resistor at least covers the light-emitting area of one of the sub-pixel areas of the pixel area, and the secondary color resistor at least covers one thin film transistor disposed in the circuit area of the sub-pixel area of the pixel area, and the secondary color resistor of one sub-color resistor has a same first color as the secondary color resistors of the other two sub-color resistors in the pixel area;

an array substrate;

a color filter substrate; and a liquid crystal layer between the array substrate and the color filter substrate;

wherein the array substrate comprises a first substrate, the thin film transistors are arranged at intervals on the first substrate, and all color resistors are arranged on a side of the thin film transistors away from the first substrate, wherein the color filter substrate comprises a second substrate and a black matrix, wherein the black matrix is arranged on a side of the second substrate close to the array substrate, and an orthographic projection of the black matrix on the first substrate completely covers an orthographic projection of each secondary color resistor on the first substrate;

wherein in all directions of a plane where the first substrate extends, the orthographic projection of the black matrix on the first substrate completely covers the circuit area;

wherein in all directions of the plane where the first substrate extends, the secondary color resistors of the sub-color resistors corresponding to each pixel area together form a continuously extending structure completely covering an entirety of the circuit areas.

2. The liquid crystal display panel according to claim 1, wherein each pixel area comprises a blue sub-pixel area, a red sub-pixel area, and a green sub-pixel area, the main color resistor covering the light-emitting area of the blue sub-pixel area is a blue main color resistor, the main color resistor covering the light-emitting area of the red sub-pixel area is a red main color resistor, and the main color resistor covering the light-emitting area of the green sub-pixel area is a green main color resistor.

3. The liquid crystal display panel according to claim 2, wherein each secondary color resistor is one of a blue secondary color resistor, a red secondary color resistor, and a green secondary color resistor.

4. The liquid crystal display panel according to claim 2, wherein, in the circuit area of one of the at least three sub-pixel areas of one of the pixel areas, each secondary color resistor is formed by stacking at least two of a blue secondary color resistor, a red secondary color resistor, and a green secondary color resistor; and portions of the secondary color resistors close to the thin film transistors have a same color.

5. The liquid crystal display panel according to claim 4, wherein in the circuit area of the red sub-pixel area, the green secondary color resistor and the blue secondary color resistor are stacked;

in the circuit area of the blue sub-pixel area, the green secondary color resistor and the red secondary color resistor are stacked; and in the circuit area of the green sub-pixel area, the green secondary color resistor and the blue secondary color resistor are stacked, or the green secondary color resistors and the red secondary color resistor are stacked.

6. The liquid crystal display panel according to claim 1, wherein each main color resistor has a color different from the first color.

7. The liquid crystal display panel according to claim 1, wherein the liquid crystal display panel further comprises a planarization layer and a pixel electrode, the planarization layer is disposed on a side of the color resisters away from the first substrate, the planarization layer is provided with a via hole, and the pixel electrode is electrically connected to one of the thin film transistors through the via hole.

8. A display device, comprising a liquid crystal display panel and a backlight module arranged opposite to each other, wherein the backlight module is configured to provide a light source to the liquid crystal display panel, and the liquid crystal display panel comprises:

a plurality of pixel areas, each comprising at least three sub-pixel areas, and each sub-pixel area comprising a light-emitting area and a circuit area connected to the light-emitting area;

a plurality of sub-pixel driving comprising a plurality of thin film transistors, wherein each sub-pixel driving circuit is disposed in the circuit area of a sub-pixel area of a pixel area;

a plurality of color resistors, each comprising at least three sub-color resistors each comprising a main color resistor and a secondary color resistor, wherein the main color resistor at least covers the light-emitting area of one of the sub-pixel areas of the pixel area, and the secondary color resistor at least covers one thin film transistor disposed in the circuit area of the sub-pixel area of the pixel area, and the secondary color resistor of one sub-color resistor has a same first color as the secondary color resistors of the other two sub-color resistors in the pixel area;

an array substrate;

a color filter substrate; and a liquid crystal layer between the array substrate and the color filter substrate;

wherein the array substrate comprises a first substrate, the thin film transistors are arranged at intervals on the first substrate, and all color resistors are arranged on a side of the thin film transistors away from the first substrate, wherein the color filter substrate comprises a second substrate and a black matrix, wherein the black matrix is arranged on a side of the second substrate close to the array substrate, and an orthographic projection of the black matrix on the first substrate completely covers an orthographic projection of each secondary color resistor on the first substrate;

wherein in all directions of a plane where the first substrate extends, the orthographic projection of the black matrix on the first substrate completely covers the circuit area;

wherein in all directions of the plane where the first substrate extends, the secondary color resistors of the sub-color resistors corresponding to each pixel area together form a continuously extending structure completely covering an entirety of the circuit areas.

9. The display device according to claim 8, wherein each pixel area comprises a blue sub-pixel area, a red sub-pixel area, and a green sub-pixel area, the main color resistor covering the light-emitting area of the blue sub-pixel area is a blue main color resistor, the main color resistor covering the light-emitting area of the red sub-pixel area is a red main color resistor, and the main color resistor covering the light-emitting area of the green sub-pixel area is a green main color resistor.

10. The display device according to claim 9, wherein each secondary color resistor is one of a blue secondary color resistor, a red secondary color resistor, and a green secondary color resistor.

11. The display device according to claim 9, wherein, in the circuit area of one of the at least three sub-pixel areas of one of the pixel areas, each secondary color resistor is formed by stacking at least two of a blue secondary color resistor, a red secondary color resistor, and a green secondary color resistor; and portions of the secondary color resistors close to the thin film transistors have a same color.

12. The display device according to claim 11, wherein in the circuit area of the red sub-pixel area, the green secondary color resistor and the blue secondary color resistor are stacked;

in the circuit area of the blue sub-pixel area, the green secondary color resistor and the red secondary color resistor are stacked; and in the circuit area of the green sub-pixel area, the green secondary color resistor and the blue secondary color resistor are stacked, or the green secondary color resistors and the red secondary color resistor are stacked.

13. The display device according to claim 8, wherein each main color resistor has a color different from the first color.

14. The display device according to claim 8, wherein the liquid crystal display panel further comprises a planarization layer and a pixel electrode, the planarization layer is disposed on a side of the color resisters away from the first substrate, the planarization layer is provided with a via hole, and the pixel electrode is electrically connected to one of the thin film transistor through the via hole.

* * * * *